(12) United States Patent
Cookingham et al.

(10) Patent No.: US 6,658,139 B1
(45) Date of Patent: Dec. 2, 2003

(54) METHOD FOR ASSESSING OVERALL QUALITY OF DIGITAL IMAGES

(75) Inventors: Robert E. Cookingham, Webster, NY (US); Brian W. Keelan, Rochester, NY (US)

(73) Assignee: Eastman Kodak Company, Rochester, NY (US)

(*) Notice: Subject to any disclaimer, the term of this patent is extended or adjusted under 35 U.S.C. 154(b) by 0 days.

(21) Appl. No.: 09/433,898

(22) Filed: Nov. 4, 1999

(51) Int. Cl.[7] .................................................. G06K 9/00
(52) U.S. Cl. ........................................ 382/112; 382/141
(58) Field of Search ................................. 382/112, 218, 382/219, 111, 141, 149, 272, 254; 348/180, 700; 358/518, 406; 399/49, 78; 702/185

(56) References Cited

U.S. PATENT DOCUMENTS

| | | | |
|---|---|---|---|
| 5,400,667 A | | 3/1995 | Feng et al. ................. 382/254 |
| 5,447,811 A | * | 9/1995 | Buhr et al. ................. 347/101 |
| 5,526,113 A | * | 6/1996 | Lengyel et al. ........... 356/124.5 |
| 5,600,574 A | * | 2/1997 | Reitan ........................ 702/185 |
| 5,687,250 A | * | 11/1997 | Curley et al. ............... 382/112 |
| 5,712,921 A | * | 1/1998 | Zabele ....................... 382/112 |
| 5,754,674 A | * | 5/1998 | Ott et al. .................... 382/112 |
| 5,778,088 A | * | 7/1998 | Stringa ....................... 382/112 |
| 5,963,654 A | * | 10/1999 | Prakash et al. ............. 382/112 |
| 5,999,636 A | * | 12/1999 | Juang ...................... 250/559.05 |
| 6,275,600 B1 | * | 8/2001 | Banker et al. ............. 358/406 |
| 6,307,980 B1 | * | 10/2001 | Quacchia .................. 348/700 |
| 6,363,162 B1 | * | 3/2002 | Moed et al. ................ 382/100 |

OTHER PUBLICATIONS

Entin et al., "Human Fusion of Image and Numeric Information in Machine–Aided Target Recognition", ALPHATECH, Inc., IEEE 1994, pp. 1734–1738.*

Westen et al., "Perceptual Image Quality Based on a Multiple Channel HVS Model", Delft University of Technology, IEEE 1995, pp. 2351–2354.*

Zwick et al, RMS Granularity: Determination of Just Noticeable Differences, SMPTE Journal, vol. 86, Jun. 1977, pp. 427–430.

Bartleson et al, Optical Radiation Measurements, Academic Press, 1984, pp. 441–489.

* cited by examiner

Primary Examiner—Jayanti K. Patel
(74) Attorney, Agent, or Firm—Raymond L. Owens

(57) ABSTRACT

A method for producing a numerical representation of perceived overall image quality of a digital test image, including creating a digital reference image series of a reference scene which differ from each other in at least one perceptual attribute, wherein each digital reference image has a corresponding numerical representation of its overall image quality; iteratively displaying one of the digital reference images and comparing that digital reference image with the displayed digital test image and continuing the process until the numerical representation of the digital test image may be satisfactorily inferred; and recording the numerical representation corresponding to the digital test image.

3 Claims, 4 Drawing Sheets

METHOD FOR ASSESSING OVERALL QUALITY OF DIGITAL IMAGES

CROSS REFERENCE TO RELATED APPLICATION

Reference is made to commonly-assigned U.S. patent application Ser. No. 09/434,140 filed Nov. 4, 1999, entitled "Apparatus for Assessing Overall Quality of Hardcopy Images" by Cookingham et al, the disclosure of which is incorporated herein.

FIELD OF THE PRESENT INVENTION

The present invention relates to the visual assessment of a displayed digital image to yield a numerical representation of the perceived overall image quality.

BACKGROUND OF THE PRESENT INVENTION

Most perceptual experiments in the past have reported results in terms of ratings scales that are indefinite or unstable, e.g. in terms of adjective descriptors such as "good" or "fair". This limits the value of these experiments to their immediate conclusions, and prevents subsequent application of the results to new problems. In addition, standard psychophysical test methods such as paired comparison, category sort, etc. are subject to one or more of the following problems (see Part II of C. J. Bartleson and F. Grum, "Optical Radiation Measurements", Vol. 5, Academic Press, New York, 1984). Examples of problems found in standard methods include: low precision, stimuli-induced range effects, limited quality range characterized, and difficulty of inference of perceptually relevant differences.

U.S. Pat. No. 5,400,667, teaches that a reference image series varying in one perceptual attribute and calibrated in terms of a corresponding objective measurement may be used to perform a visual assessment of the objective measurement value associated with a test sample by identifying which member of the reference image series is most similar in the appearance of the varying perceptual attribute. For example, a reference image series varying in resolution in a known fashion can be used to perform a visual assessment of the resolution of a test image. A small number of adjective descriptors (e.g. "good" or "fair") are associated with the measurement scale to provide a crude perceptual characterization. For example, a resolving power of 1 cycle/mm might be considered "poor" and 5 cycles/mm "good". While the method of U.S. Pat. No. 5,400,667 can reduce the magnitude of the examples of problems mentioned above, it is still deficient in a number of respects, as set forth below (1) It provides a measure of only a single perceptual attribute, namely, the perceptual attribute that varies within the reference image series. Practical imaging systems produce images with many combinations of perceptual attributes, so that customer satisfaction will be only partially correlated with any single perceptual attribute. What is of much greater relevance is the overall image quality. The term "overall image quality" means a subjective determination by a user of an image reflecting the relative acceptability of such image to the user. For example, if a test image had "good" resolution but "poor" color quality, matching the appearance to a reference image series varying in resolution according to the method of U.S. Pat. No. 5,400,667 would yield an estimate of the objective measurement value of resolving power (approximately 5 cycles/mm) and an associated adjective descriptor of "good". However, the overall image quality of the test image would be lower than this due to the poor color quality.

(2) The adjective descriptors provide only a very coarse classification and are not quantitative in nature. The same adjective descriptors are interpreted to mean different things by different people, and the application of adjective descriptors changes over time. The differences in quality between adjacent adjective descriptors is not uniform and is larger than the differences that need to be characterized in product design.

(3) The method also does not include a provision for individual calibration of reference image series depending on their scene content. It is well known that scene content significantly affects the impact of different attributes on overall image quality. For example, the overall image quality of complex scenes with considerable fine detail is relatively less affected by the presence of a given amount of noise, as determined by objective measurement values, than is that of simpler scenes with large areas of slowly changing color (e.g. blue sky; see D. M. Zwick and D. L. Brothers, "RMS Granularity: Determination of Just-Noticeable-Differences", SMPTE 86, pp. 427–430, 1977).

(4) U.S. Pat. No. 5,400,667 discloses reference image series spanning the range from "very poor" to "very good", which may not be a good match to the range of test images to be evaluated in a particular application.

(5) The method does not identify a preferred relationship among the increments of change between the adjacent members of the reference image series, yet this affects the speed and precision of the visual assessments.

(6) U.S. Pat. No. 5,400,667 does not discuss requirements for the viewing environment in which the visual assessment is made; however, this must be carefully controlled to obtain accurate and reproducible results.

(7) The method does not include a provision for evaluation and correction of user bias due to, for example, a tendency in the visual assessment to avoid approaching end numbers in the reference image series.

SUMMARY OF THE PRESENT INVENTION

It is an object of the present invention to provide a method of measuring perceived overall image quality of a digital test image in terms of a numerical scale representing overall image quality.

This object is achieved by a method for producing a numerical representation of the perceived overall image quality of a digital test image, comprising the steps of:

(a) creating a digital reference image series of a reference scene that differ from each other in at least one perceptual attribute, wherein each digital reference image has a corresponding numerical representation of its overall image quality;

(b) iteratively displaying one of the digital reference images and comparing that digital reference image with the displayed digital test image, continuing the process until the numerical representation of the digital test image may be satisfactorily inferred; and (c) recording the numerical representation corresponding to the digital test image.

The present invention incorporates a digital reference image series that is calibrated against a standard numerical scale of overall image quality and is presented in a fashion that facilitates direct comparison of any of the digital reference images with the digital test image under matched viewing conditions. The present invention permits visual assessment of the overall image quality of the digital test image compared to the most similar digital reference images from the digital reference image series. The present invention also permits untrained personnel to perform calibrated visual assessments of overall image quality with accuracy and precision comparable to that of highly trained professionals using standards of limited availability.

Additional advantages of the present invention include:

(1) The present invention provides a measure of overall image quality rather than a single perceptual attribute, the former being more strongly correlated with customer satisfaction.

(2) The present invention produces a numerical representation of overall image quality that may be calibrated to an established scale with desirable properties such as associated physical standards, known increments of perceptual relevance, and general acceptance.

(3) The present invention provides for individual calibration of digital reference image series based on different reference scenes. This improves the accuracy of the method by accounting for the well-known variation of the effect of a perceptual attribute on overall image quality due to scene content (see D. M. Zwick and D. L. Brothers, "RMS Granularity: Determination of Just-Noticeable-Differences", SMPTE 86, pp. 427–430, 1977).

(4) The present invention permits optimization of the number of members in the digital reference image series and the increments of change between them, taking into account the range of overall image quality of the digital test images and the required precision. Proper choice of these properties minimizes the time spent by the user to produce numerical representations of a given required precision.

(5) The present invention creates a viewing environment in which important viewing factors such as viewing distance, viewing angle, illumination level, user adaptation level and flare light can be precisely matched between the displayed digital test image and the displayed digital reference image. This improves the accuracy of visual assessments by eliminating sources of bias. The present invention further permits such viewing factors to be fixed at specific prescribed values, which is important when these factors affect the appearance of perceptual attributes of either the digital test images or the digital reference images.

(6) The present invention permits correction for user and experimental biases by including within the digital test images one or more images that are identical to members of the digital reference image series either in terms of appearance or objective characteristics.

The performance of the present invention has been tested in several ways that demonstrate its effectiveness. First, the uncertainty in a single assessment has been measured and found to be two to four times smaller than standard psychophysical methods such as magnitude estimation and category sort problems (see Part II of C. J. Bartleson and F. Grum, "Optical Radiation Measurements", Vol. 5, Academic Press, New York, 1984). This uncertainty is comparable to that achieved by highly trained professionals using cumbersome standards. Second, the accuracy and precision of results obtained when the digital test image depicts a different scene than that of the digital reference series have been found to be just as good as in the case where the scenes are matched, a surprising result. This permits digital test images depicting arbitrary scenes to be evaluated without loss of performance.

DETAILED DESCRIPTION OF THE PREFERRED EMBODIMENTS

The present invention has been described in detail with particular reference to certain preferred embodiments thereof, but it will be understood that variations and modifications can be effected within the spirit and scope of the present invention.

The present invention improves upon existing methods by incorporating a digital reference image series that is calibrated against a standard numerical scale of overall image quality and is presented in a fashion that facilitates direct comparison of any of the digital reference images with the digital test image under matched viewing conditions, permitting visual assessment of the overall image quality of the digital test image compared to the most similar digital reference images from the digital reference image series.

Figure 1:
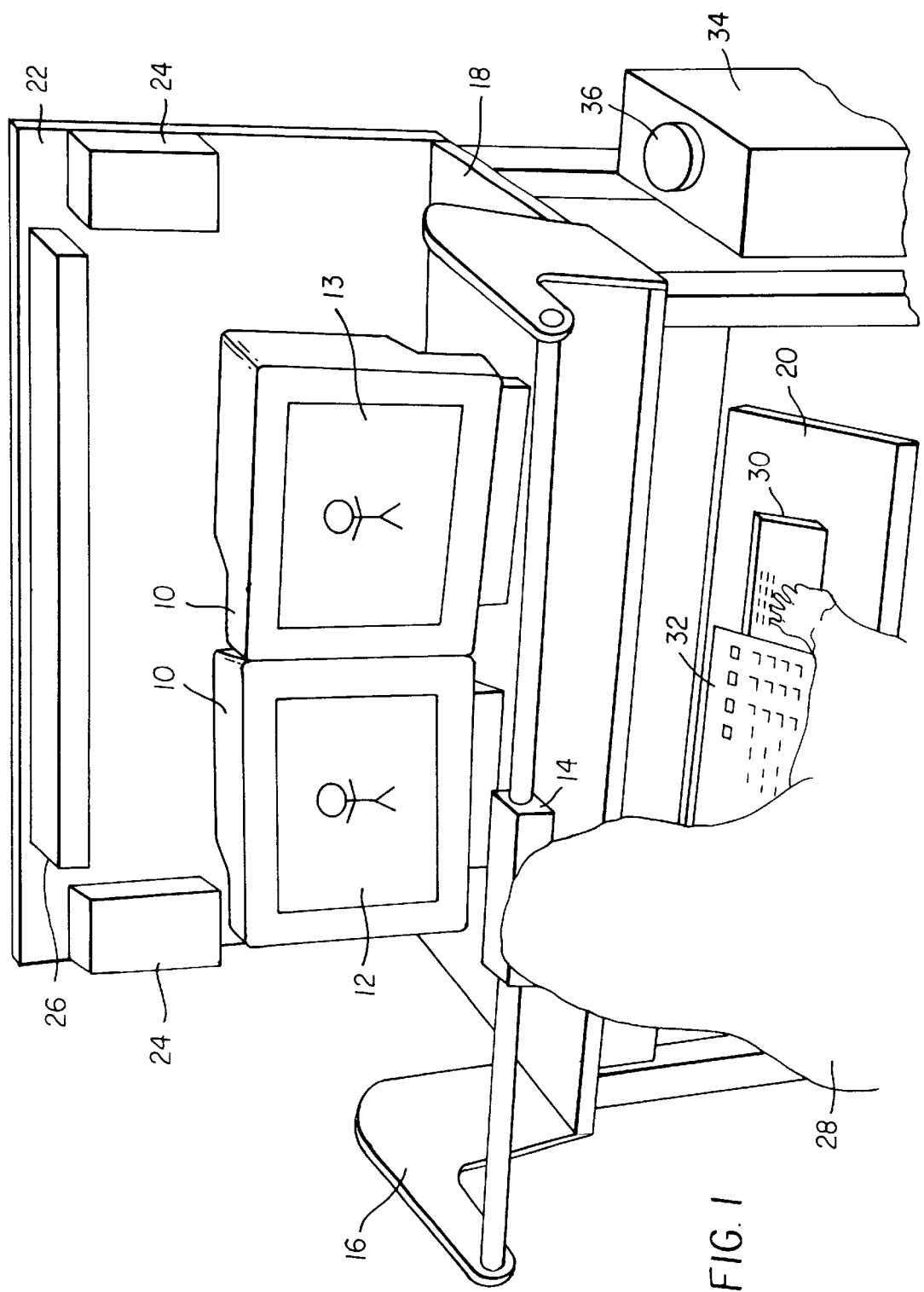
FIG. 1 is a pictorial representation of the viewing environment used in performing visual assessments using the methods of the present invention.

The method of producing a numerical representation of overall image quality of a digital test image in accordance with a preferred embodiment of the present invention can be implemented using the viewing environment shown in FIG. 1. The viewing environment includes two high-resolution video monitors 10 for viewing images. The digital video monitors 10 are calibrated as closely as the manufacturers and video industry specifications will permit to the same video color and tonescale positions. This identical calibration is necessary to minimize the random differences between a displayed digital test image 12 and a displayed reference image 13. These digital video monitors are supported on a video monitor table 18. The displayed digital test image 12 and the displayed digital reference image 13 are viewed by a user 28 at a fixed viewing distance constrained by the user 28 keeping their forehead against a viewing distance restraint 14. The viewing distance restraint 14 is mounted on a support for viewing distance restraint 16. To maintain normal light surround viewing conditions, the illuminated neutral wall 22 behind video monitor table 18 is maintained at a luminance of 25% of the white luminance of the digital video monitor 10. Two variable intensity light sources, dual vertical light sources 24 and a horizontal light source 26, are independently controlled to provide a uniform illuminated neutral wall 22 within the user's 28 field of view. This placement of the dual vertical light sources 24 and horizontal light source 26 provides for normal visual light adaptation conditions without producing flare light on the displayed digital test image 12 or the displayed digital reference image 13. By varying the level of luminance of the illuminated neutral wall 22, visual adaptation conditions ranging from normal light surround viewing environments to dark surround viewing environments for high quality video monitor viewing are produced. The user 28 enters all image pair assessments using a data entry keypad 30, and a standard computer keyboard 32 is used to enter documentation information. Both the data entry keypad 30 and the computer keyboard 32 are maintained at a convenient operational height on a data entry keypad table 20. A computer 34 controls the display of all images and record all of the user's 28 visual assessments. The digital test images 12 and the digital reference images 13 are stored on a digital image storage disk 36 until retrieved by the computer 34 for display.

Figure 2:
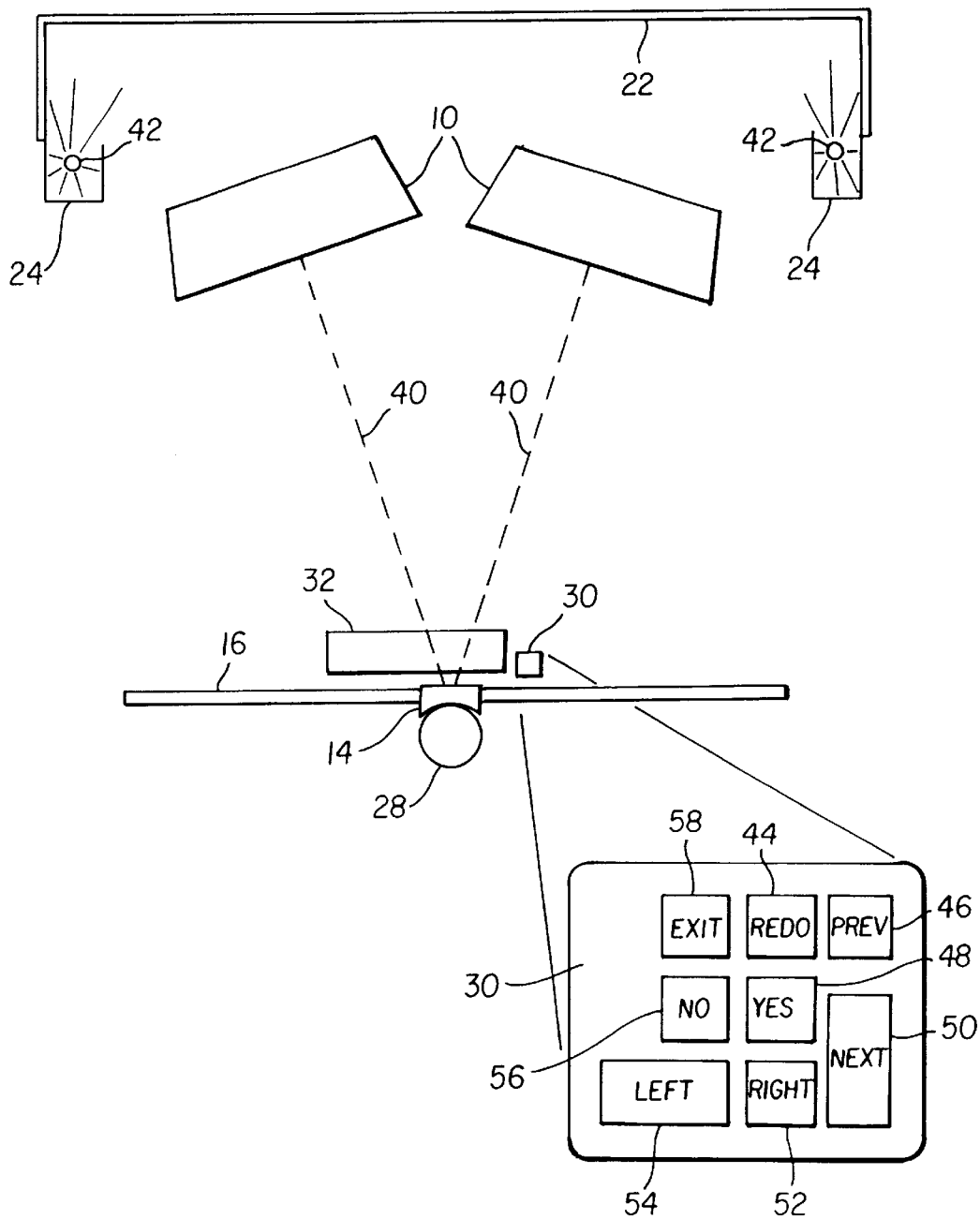
FIG. 2 is a cross-sectional schematic showing the spatial relationship of the viewing environment with the data entry keypad shown in more detail and in an exploded fashion.

Referring to FIG. 2, this cross-sectional schematic shows the spatial relationship of the digital video monitors 10, the dual vertical light sources 24, the user 28, the viewing distance restraint 14, the computer keyboard 32, and the data entry keypad 30. The user 28 is seated in a manner that both digital video monitors 10 are viewed normal to the face plate of the digital video monitor 10. The viewing distance 40 is maintained at a fixed distance such that both images are viewed comfortably and no image structure artifacts normally associated with video display are visible. Fluorescent D5000 tubes 42 are used in both the vertical light sources 24 and the horizontal light source 26 to illuminate the illuminated neutral wall 22. An exploded view detailing the layout of the data entry keypad 30 is shown in FIG. 2.

When employing the method of the present invention to produce a numerical representation of the overall image quality by the visual assessment of a displayed digital test image 12, the user 28 is instructed to indicate whether a displayed digital test image 12 or a displayed digital reference image 13 is of higher overall image quality. The user's 28 image pair assessment is recorded by using the RIGHT key 52 or LEFT key 54 on the data entry keypad 30. All image pair assessments of displayed digital test images 12, and displayed digital reference images 13 are recorded in this fashion. Other control keys shown in FIG. 2 include the following control options.

The EXIT key 58 permits the user 28 to exit the control program at any time. To insure the program is not exited prematurely, the user 28 is asked to confirm the request to exit the control program and indicates their response with the YES key 48 or the NO key 56.

If the user 28 needs to alter the current sequence of image pair assessments for the currently displayed digital test image 12, the REDO key 44 is employed. Using the REDO key 44 function reinitiates the control program for the currently displayed digital test image 12.

If the user 28 needs to alter a previous visual assessment of a displayed digital test image 12, the PREV 46 key is used to index back to the previously displayed digital test image 12 desired. The control program will then permit the user 28 to perform another visual assessment of the selected displayed digital test image 12. The new visual assessment will replace the previously determined visual assessment in the experimental data file 112.

When the user 28 desires to return the next digital test image 12 to continue visual assessment, the NEXT key 50 is used to index forward. The control program then allows the user 28 to index to the next digital test image 12. With the use of the PREV key 46 and NEXT key 50, a user 28 can assess and review any and all previous visual assessments.

Figure 3:
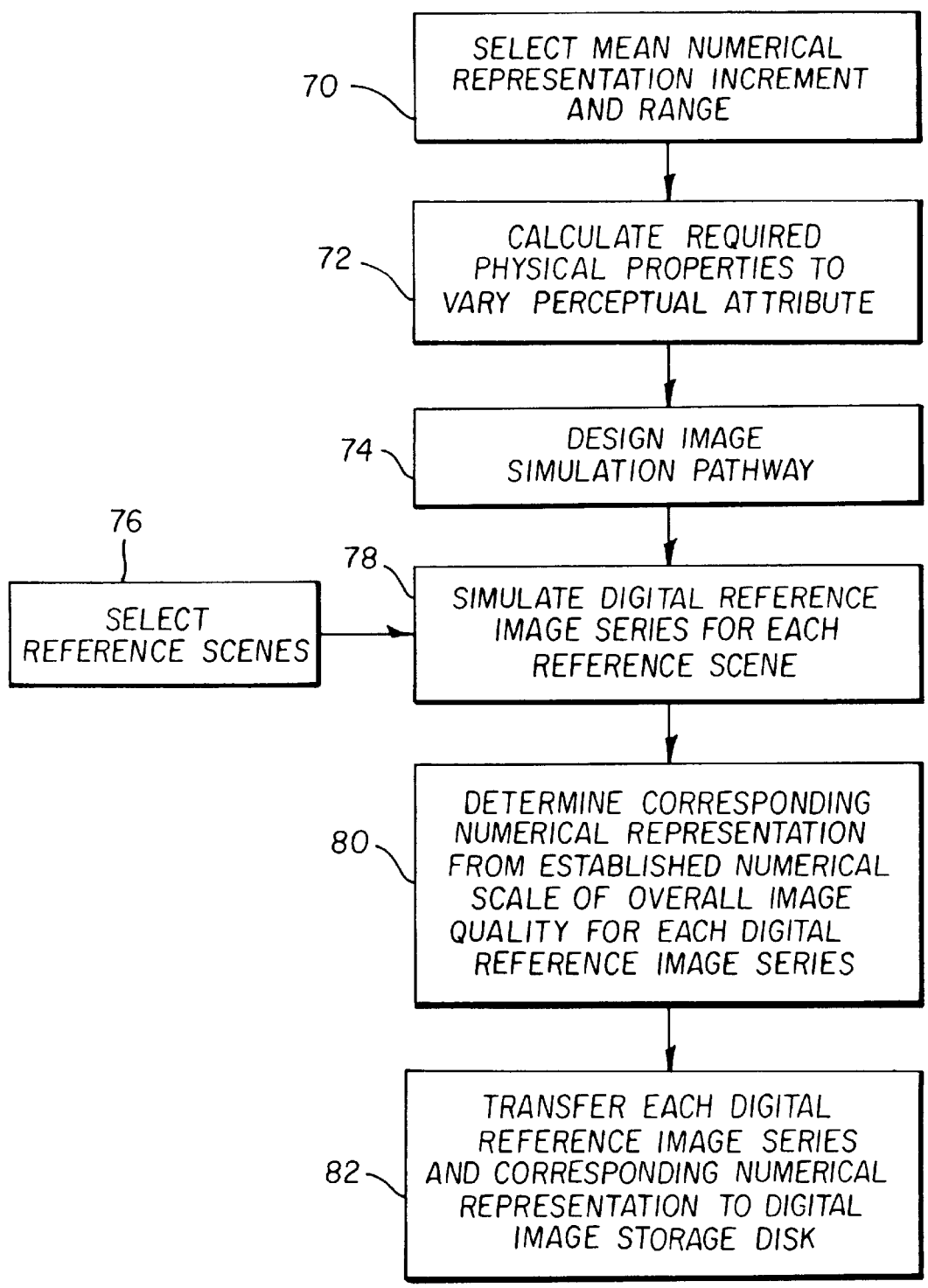
FIG. 3 is a flowchart showing one way of creating a reference image series the members of which vary from each other by at least one perceptual attribute and wherein each reference image has a corresponding numerical representation of overall image quality.

The digital reference image series are most conveniently produced through the use of digital image simulation using techniques well known in the art. However, the simulation of the necessary digital reference image series requires a precise application of standard digital image simulation techniques according to the method taught in FIG. 3. The first step in producing a digital reference image series is to select the numerical representation increment and range 70. The increments selected for the numerical representation should be perceptually uniform or slowly varying. In the preferred embodiment it was found particularly advantageous to have the increments of the numerical representation approximately equal to one (1) just noticeable difference of overall quality. This facilitates the best combination of speed and precision for the user. The range of the digital reference image series should slightly exceed the expected range of overall image quality exhibited by the digital test images to be assessed using the method of the present invention.

Given the selected numerical representation increment and range 70, the physical properties required to vary the perceptual attribute under consideration in the digital reference image series are calculated in block 72. In the preferred embodiment, where the perceptual attribute varied is image sharpness, the modulation transfer function of the displayed digital reference image necessary to produce images with the desired numerical representation increment and range selected 70 would be calculated. An image simulation pathway is then designed 74 to produce the digital reference image series. In the preferred embodiment disclosed in the present invention, the modulation transfer function of the digital reference images is changed through the use of digital filters introduced in the image simulation pathway in a manner well known in the art.

The next step in block 76 is to select the reference scenes to be used in each of the digital reference image series. The reference scenes of block 76 do not need to be the same scenes as the depicted in the digital test images. A comparison was made between the accuracy and precision in situations where the scenes depicted in the digital test images are and are not the same as those in the digital references image series. The precision and accuracy of the numerical representation of the overall image quality was found to be identical. If the numerical representation of a wide variety of displayed digital test images 12 of many different scenes is going to be determined using this method, it is best to prepare a number of digital reference image series for use in making the visual assessments. Users are generally more comfortable and confident making visual assessments when the displayed digital test image 12 and the displayed digital reference image 13 are of the same general type, i.e. indoor flash, outdoor scenic, outdoor group, indoor public building, or any other general categories.

Given the selection of the digital reference scenes in block 76, a digital image simulation pathway in block 74 is used to simulate a digital reference image series 78 for each increment over the range of the numerical representation determined in 70. This is done for each reference scene selected 74. The term digital image simulation pathway means a series of digital processing steps performed to yield images with desired properties. These steps are well known and will suggest themselves to those skilled in the art.

At this point, the numerical representations associated with each of digital reference images 13 in the digital reference image series 78 are those corresponding to an average scene having the specified physical properties 72. To further extend this method to permit scene specific calibration of each digital reference image series 78, each unknown scene is individually calibrated to accommodate scene content effects 80. This is done by cross-comparison of the selected digital reference scenes to standard scenes containing the same perceptual attribute. The standard scenes are calibrated by trained expert judges using special standards under standard viewing conditions. Preferably, a high sharpness and a low sharpness digital reference image of a number of scenes of known modulation transfer function and known numerical representation produced using the image simulation pathway 74 are cross compared to digital reference images produced using the same simulation pathway 74 for each of the digital reference scenes selected in 76. Once an unknown scene that suffers the same change in overall image quality as a scene with a known relationship between the acutance and the numerical representation, the numerical representation associated with the known scene is assigned to the unknown scene. This process is repeated to calibrate all unknown scenes. Following the calibration of each series of digital reference images, the digital reference images and the corresponding numerical representation are transferred 82 to the digital image storage disk 36.

Figure 4:
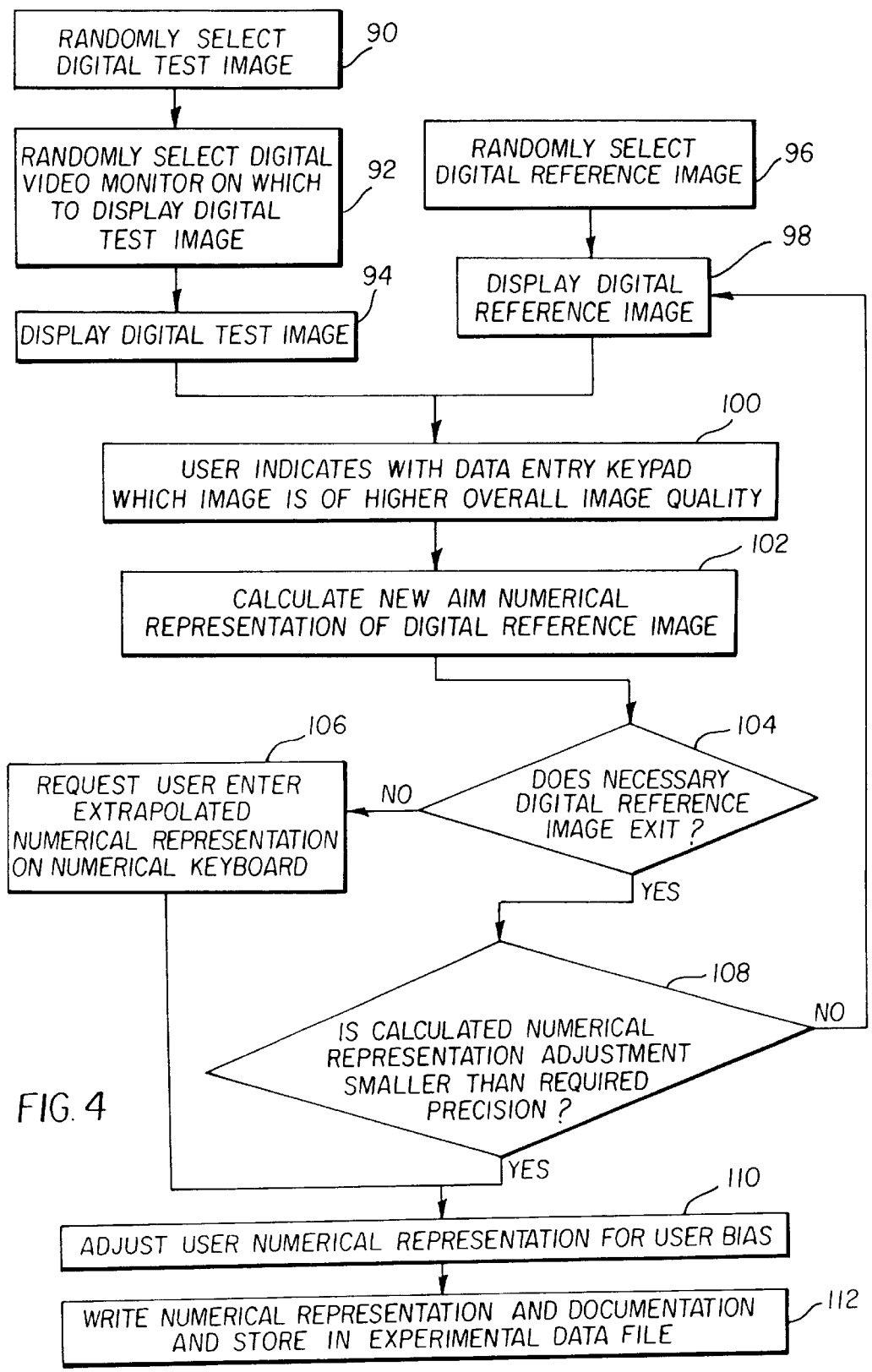
FIG. 4 is a flowchart showing how the perceived overall image quality of a displayed digital test image is visually assessed and a numerical representation assigned and stored.

FIG. 4 is a flowchart showing how the perceived overall image quality of a displayed digital test image 12 is visually assessed and a numerical representation assigned and stored. With further reference to FIG. 1, to begin the visual assessment, the control program resident in the computer 34 randomly selects a digital test image shown as block 90 in FIG. 4. Many different digital test images may be prepared in advance and stored on the digital image storage disk 36 prior to selection. Next, the control program randomly selects which of the two digital video monitors 10 shall display the digital test image 12. In FIG. 1, the displayed digital test image 12 is shown schematically as being displayed on the left digital video monitor; however, in the preferred embodiment the monitor is randomly selected to randomize any small differences between the two digital video monitors 10. Consequently the digital reference image 13 may also be displayed on either of the digital video monitors 10 once the selection has been made for the displayed digital test image 12. The initial displayed digital reference image is randomly selected as shown in block 96 from the digital reference image series 78 stored on the digital image storage disk 36. Although this step could be omitted and each visual assessment started with the same digital reference image 13, in the preferred embodiment, the use of randomly selected initial digital reference image 13 has been shown to generate less biased and more precise visual assessments.

Both the displayed digital test image 12 and the displayed digital reference image 13 are displayed in blocks 94 and 98 on their respective randomly selected digital video monitors 10 for viewing by the user 28. The user 28 then performs an image pair assessment 100 between the displayed digital test image 12 and the displayed digital reference image 13. The image pair assessment 100 is made on the basis of which image is of higher overall image quality and is the image the user would want to have if they could only have one of the two images and the image one of great significance to the user. The image pair assessment 100 is entered by the user on the data entry keypad 30 using either the RIGHT key 52 or LEFT key 54 corresponding to the digital video monitor on which the image with higher overall image quality is displayed.

The control program then uses a binary search algorithm to calculate a new aim numerical representation of the digital reference image 102. The search algorithm selects the new aim numerical representation to be halfway between the closest numerical representations producing different image pair assessments (left or right). If one of the two possible image pair assessments has not yet been made, a numerical representation just outside the range of the digital reference image series is used instead. In the preferred embodiment, the control computer keeps track of all possible numerical representations in an ordered table and can quickly determine which digital reference image to display next.

If the user's sequence of image pair assessments leads to a new aim numerical representation 102 outside the range of available numerical representations 70, the logic associated with decision step 104 requests that the user to enter an extrapolated numerical representation 106 on the computer keyboard 32. If the new aim numerical representation 102 is within the range of available numerical representations 70, the control program determines if the numerical representation adjustment is smaller than the required precision 108, and if so, and the assessment loop is exited. At this point an adjustment is made to the numerical representation to account for any bias exhibited by the user in making image pair assessments 110. In the preferred embodiment, any user bias is detected and quantified by presenting displayed digital test images 12 to the user that are identical to one or more digital reference images and assigning any consistent deviations to bias by that user. The numerical representation and documentation are written to an experimental data file as shown in block 112.

The numerical representation along with the documentation identifying the nature of the displayed digital test image 12 is then stored and maintained by the control computer for subsequent analysis.

The invention has been described in detail with particular reference to certain preferred embodiments thereof, but it will be understood that variations and modifications can be effected within the spirit and scope of the invention.

PARTS LIST 10 digital video monitor
12 displayed digital test image
13 displayed digital reference image
14 viewing distance restraint
16 support for viewing distance restraint
18 video monitor table
20 data entry keypad table
22 illuminated neutral wall
24 vertical light source
26 horizontal light source
28 user
30 data entry keypad
32 computer keyboard
34 computer
36 digital image storage disk
40 viewing distance
42 fluorescent light source
44 REDO key
46 PREV key
48 YES key
50 NEXT key
52 RIGHT key
54 LEFT key
56 NO key
58 EXIT key
70 mean numerical representation increment and range
72 calculate physical properties
74 design image simulation pathway
76 select reference scenes
78 simulate reference image series
80 determine corresponding numerical representation
82 transfer each reference image series
90 randomly select digital test image
92 randomly select digital video monitor
94 display digital test image
96 randomly select digital reference image
98 display digital reference image
100 user indicates with data entry keypad
102 calculate new aim numerical representation
104 does necessary digital reference image exist
106 request user enter extrapolated numerical representation
108 calculated numerical representation adjustment
110 adjust user numerical representation for user bias
112 write numerical representation and documentation

What is claimed is:

1. A method for producing a numerical representation of user perceived overall image quality of a digital test image, comprising:
   (a) creating a digital reference image series of a reference scene, each digital reference image differing from each other digital reference image in at least one perceptual attribute, wherein each digital reference image has a corresponding numerical representation of overall image quality;
   (b) iteratively displaying to a user one of the digital reference images and comparing the displayed digital reference image with the digital test image, the user indicating perceived overall image quality between the displayed digital reference image and the digital test image, the next displayed digital reference image being selected based on the user indication of perceived overall image quality;
   (c) inferring the numerical representation of the digital test image from the iteratively displaying and comparing; and
   (d) recording the inferred numerical representation corresponding to the digital test image.

2. The method of claim 1 wherein the iteratively displaying includes the user visually assessing whether the digital test image has a higher or lower overall image quality than that of the displayed digital reference image, and the iteratively displaying continuing until the comparing produces no user perceived difference between the overall image quality of the displayed digital reference image and the digital test image.

3. The method of claim 1 wherein the user visually assesses whether the digital test image has a higher or lower overall image quality than the displayed digital reference image; based on the visual assessment, a digital reference image is selected for the next visual assessment; and the visual assessment continuing until the numerical representation has been determined to a predetermined precision.

* * * * *